Feb. 4, 1958 R. C. IMM 2,822,470
CIRCUITS FOR CONTROLLING THE PEAK AMPLITUDE OF ELECTRIC CURRENT PULSES
Filed Nov. 3, 1954
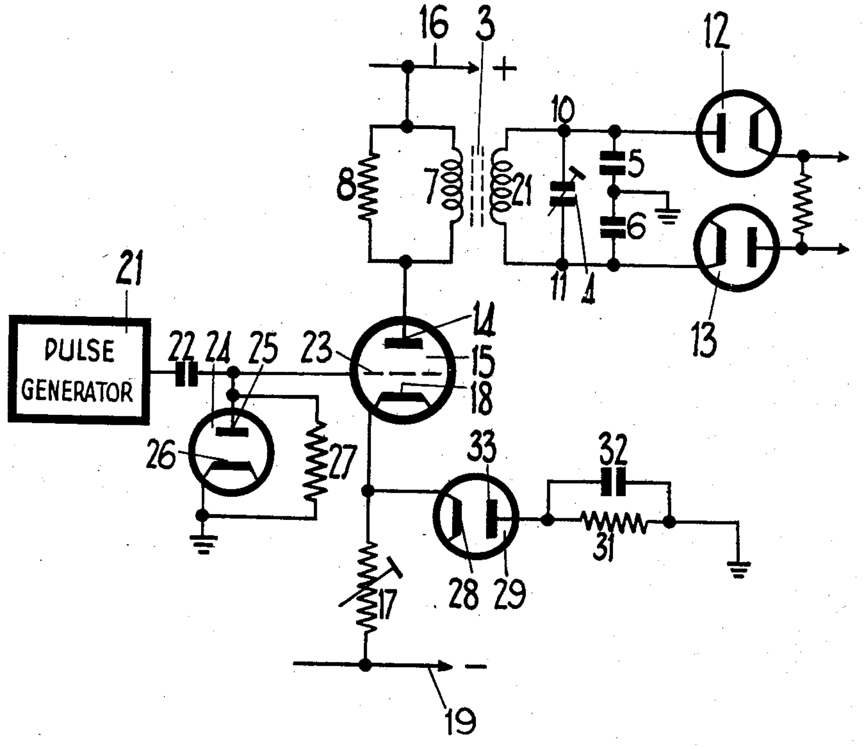
INVENTOR
RONALD CHARLES IMM
BY [signature]
ATTORNEY // United States Patent Office 2,822,470

Patented Feb. 4, 1958

2,822,470

CIRCUITS FOR CONTROLLING THE PEAK AMPLITUDE OF ELECTRIC CURRENT PULSES

Ronald Charles Imm, Ruislip Manor, England, assignor to The General Electric Company Limited, London, England Application November 3, 1954, Serial No. 466,529

Claims priority, application Great Britain November 4, 1953

3 Claims. (Cl. 250—27)

The present invention relates to circuits for controlling the peak amplitude of electric current pulses.

In the coding apparatus of a pulse code modulation system, it is known to make use of a train of pulses of progressively decreasing amplitude during the coding of each sample amplitude of the signal to be transmitted. With binary coding, each pulse of such a train, after the first, has one half the amplitude of the previous pulse. Some constructions of coding apparatus make use of two such trains of decremental pulses, one train being positive-going and the other negative-going, and one example of this is described in British patent specification No. 664,401. In addition, one or two trains of decremental pulses may be used in the decoding apparatus of a pulse code modulation system.

One method of generating a train of pulses of progressively decreasing amplitude that is suitable for use in the coding or decoding apparatus of a pulse code modulation system is to impulse a parallel-resonant circuit, this circuit being tuned to the desired recurrence frequency of the pulses of progressively decreasing amplitude while the circuit itself has a time constant such that the amplitudes of adjacent pulses are in the desired ratio. The absolute amplitude of each pulse generated in this manner is of course dependent, inter alia, upon the amplitude of the current pulse used to excite the parallel-resonant circuit. It is desirable in a pulse code modulation system that the trains of decremental pulses used in the coding and decoding apparatus shall be of constant amplitude and not subject to variations due to valve ageing or small changes in operating voltages.

One object of the present invention is to provide a circuit for controlling the peak amplitude of electric current pulses.

According to the present invention, a circuit for controlling the peak amplitude of electric current pulses comprises a grid-controlled thermionic valve, a path over which are arranged to be supplied positive-going electric pulses to the control grid of said valve, resistance in the cathode circuit of said valve, means to maintain the end of said resistance remote from the valve cathode at a voltage that is negative with respect to the voltage on the control grid of the valve in the absence of an applied pulse, and means to provide a path for current through the said resistor by-passing the said valve when the voltage at the end of the said resistor nearest to the valve cathode falls below a pre-determined value whereby, when a succession of positive-going pulses is supplied over the said path, during operation of the circuit, current passes through the said valve only during an applied pulse and the peak amplitude of each such pulse of current that passes through the valve is substantially determined by the magnitude of said resistance.

Preferably the said resistance is variable so that the peak amplitude of current pulses passed by the valve may be varied. The by-pass path may comprise a rectifier element connected in series with a resistance-capacity network between the said end of the resistance nearest to the valve cathode and a point that is maintained, during operation of the circuit, at a fixed voltage, the resistance-capacity network having a relatively long time constant. The said point to which the by-pass path is taken may in fact be earthed.

Apparatus for generating trains of decremental pulses and including a circuit in accordance with the present invention will now be described by way of example with reference to the accompanying drawing which shows diagrammatically the circuit of the apparatus. This apparatus, which is for use in the coding or decoding apparatus of a pulse code modulation system, is required to supply two trains of decremental pulses, one positive-going and one negative-going, the pulses of each train having a recurrence frequency of 420 kilocycles per second and each train consisting of five pulses, the peak amplitude of each after the first being one half that of the preceding pulses of the train.

Referring now to the drawing, the trains of pulses are generated by periodically impulsing a tuned circuit 1 that consists of a secondary winding 2 of a transformer 3 that is connected in parallel with a condenser 4. Two additional condensers 5 and 6 that are connected in series are connected across this parallel-tuned circuit 1 and the junction of these two condensers 5 and 6 is earthed. The primary winding 7 of the transformer 3 is shunted by a resistor 8 and is arranged to carry current pulses for the purpose of impulsing the parallel-tuned circuit 1. During operation, this primary winding 7 carries pulses having a frequency of 84 kilocycles per second, with the result that a pair of balanced signals are developed at the points 10 and 11, each of these signals having a damped sinusoidal waveform. These two signals are fed to two diode valves 12 and 13 respectively, and these valves are biassed so as only to pass those portions of the waveforms that are positive and negative respectively with respect to earth. The signals passed by these two valves constitute the desired trains of decremental pulses.

The primary winding 7 of the transformer 3 and its shunting resistor 8 are connected between the anode 14 of a grid-controlled thermionic valve 15 and a supply line 16 that is maintained at a voltage of 150 volts above earth. Although shown in the drawing as a triode, the valve 15 may be a pentode. A preset resistor 17 having a value of 15,000 ohms is connected between the cathode 18 of the valve 15 and a supply line 19 that is maintained at a voltage of 150 volts below earth.

A signal consisting of positive-going pulses having a recurrence frequency of 84 kilocycles per second is supplied by a pulse generator 21 and is fed through a condenser 22 to the control grid 23 of the valve 15. These pulses have a substantially rectangular waveform and an on-off ratio of 1:10, the amplitude of these pulses being 10 volts. A diode valve 24 is provided with its anode 25 connected to the control grid 23 and its cathode 26 connected to earth for the purpose of clamping the control grid voltage, this diode valve 24 being shunted by a resistor 27.

The cathode 28 of another diode valve 29 is connected to the cathode 18 of the valve 15 and a resistor 31 and a condenser 32 in parallel are connected between the anode 33 of this diode 29 and earth. This resistor 31 may have a value of 500 ohms and the condenser 32 a value of 0.1 microfarad so that, during operation, the anode 33 of this diode valve 29 is biassed approximately five volts below earth.

Considering now the circuit for supplying current pulses to the primary winding 7 of the transformer 3, it will be realised that upon the application of a pulse to the control grid 23 of the valve 15, the control grid 23 is at earth potential, due to the clamping action of the diode valve 24 and the valve 15 thus operates as a cathode follower stage with the result that the diode valve 29 is non-conducting.

Under these conditions the valve 15 draws no grid current with the result that the anode current thereof and thus, assuming that the voltage of the supply lines 16 and 19 are well stabilised, the current in the primary winding 7 of the transformer 3 has a value determined substantially by the preset resistor 17. Upon the cessation of an applied pulse, the control grid voltage falls by ten volts, and there is an appreciable drop in the cathode voltage of the valve 15. This causes the diode valve 29 to be conducting with the result that all the current through the preset resistor 17 is by-passed through this diode valve 29 and the valve 15 is cut off so that no current flows through the primary winding 7 of the transfomer 3. The current through this diode valve 29 charges the condenser 32 thereby providing the bias voltage which prevents it conducting when a pulse is supplied by the pulse generator 21.

The pulse generator 21 may be formed by a blocking oscillator. Preferably the pulses of the signal supplied thereby have a duration of approximately one half the natural period of the tuned circuit 1. Thus, in the present case, these pulses may each have a duration of approximately 1.2 micro-seconds.

I claim:

1. A circuit for supplying a train of electric current pulses comprising a source of positive-going electric pulses, a grid-controlled thermionic valve, a pulse input path for feeding the said positive-going electric pulses from the said source to the control grid of said valve, a resistance in the cathode circuit of said valve, means to maintain the end of said resistance remote from the valve cathode at a first voltage that is negative with respect to the voltage on the control grid of the valve in the absence of an applied pulse, a two-terminal rectifier element, a path connected between one terminal of the rectifier element and the end of the said resistance nearest to the valve, and a resistance-capacity network connected between the other terminal of the rectifier element and a point that is maintained during operation at a second voltage that is more positive than the first voltage, the arrangement being such that, during operation of the circuit, between pulses supplied by the source the said valve is cut off and current flows through the rectifier element and the said resistance towards the end of the resistance that is at the first voltage, thereby developing a bias across the resistance-capacity network, whilst each pulse supplied by the source causes the valve to be conducting and the rectifier element to be cut off, the peak amplitude of each pulse of current that passes through the valve as a result of a pulse supplied by the source thus being determined mainly by the magnitude of said resistance.

2. A circuit according to claim 1 wherein the said pulse input path includes a condenser through which the electric pulses are supplied from the source to the control grid of the valve and there is provided means to clamp the control grid voltage so that it cannot exceed a predetermined value.

3. In apparatus for generating trains of decremental pulses by periodically impulsing a parallel resonant circuit, a circuit according to claim 1 for supplying current pulses for impulsing the said parallel resonant circuit.

References Cited in the file of this patent

UNITED STATES PATENTS

| | | |
|---|---|---|
| 2,418,375 | Tourshou | Apr. 1, 1947 |
| 2,421,025 | Grieg | May 27, 1947 |
| 2,490,026 | Buckbee | Dec. 6, 1949 |
| 2,506,124 | White | May 2, 1950 |
| 2,509,742 | Mynall | May 30, 1950 |
| 2,594,916 | Gulnac | Apr. 29, 1952 |
| 2,697,747 | Baker | Dec. 21, 1954 |
| 2,737,582 | Hall | Mar. 6, 1956 |